UNITED STATES PATENT OFFICE.

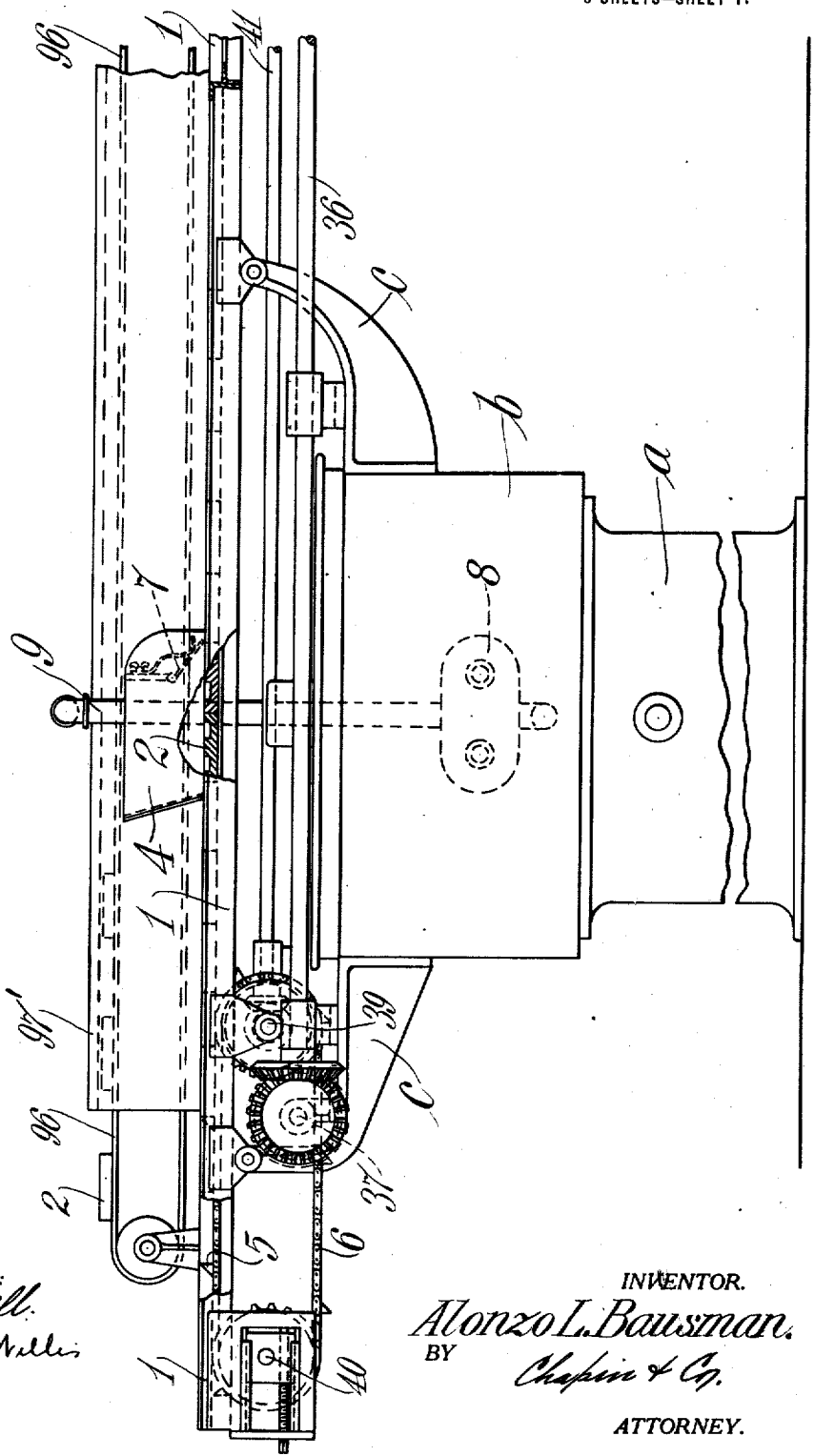

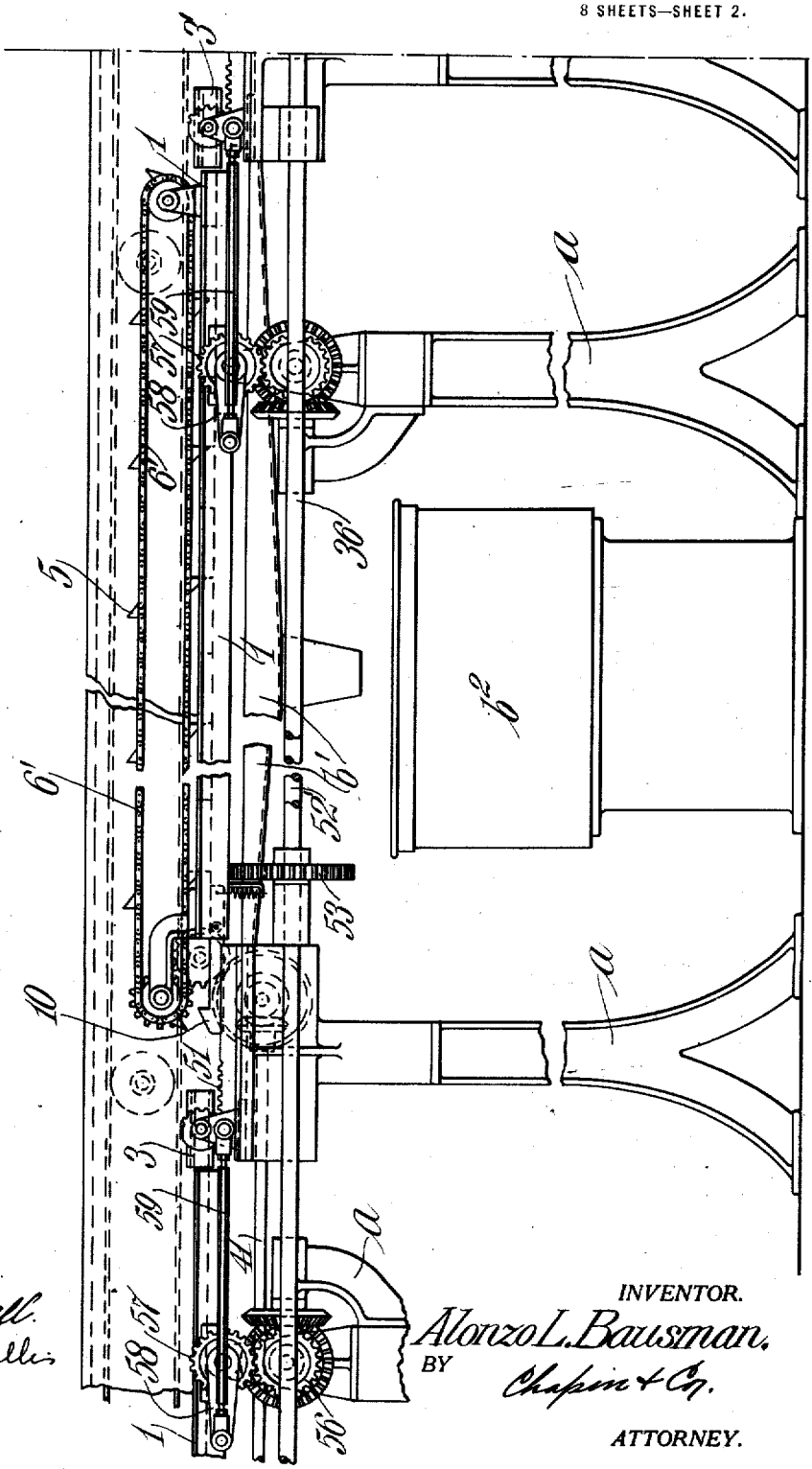

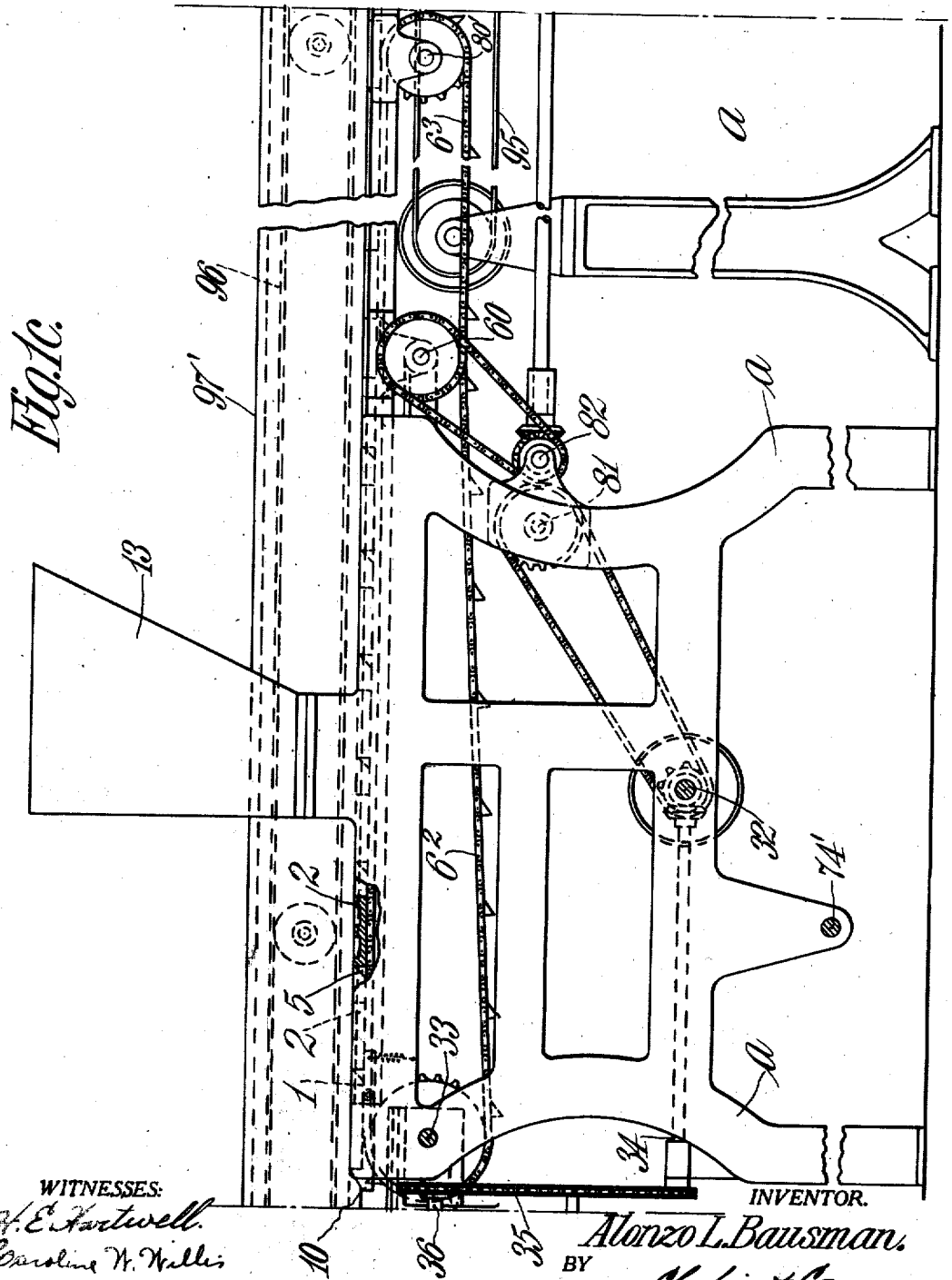

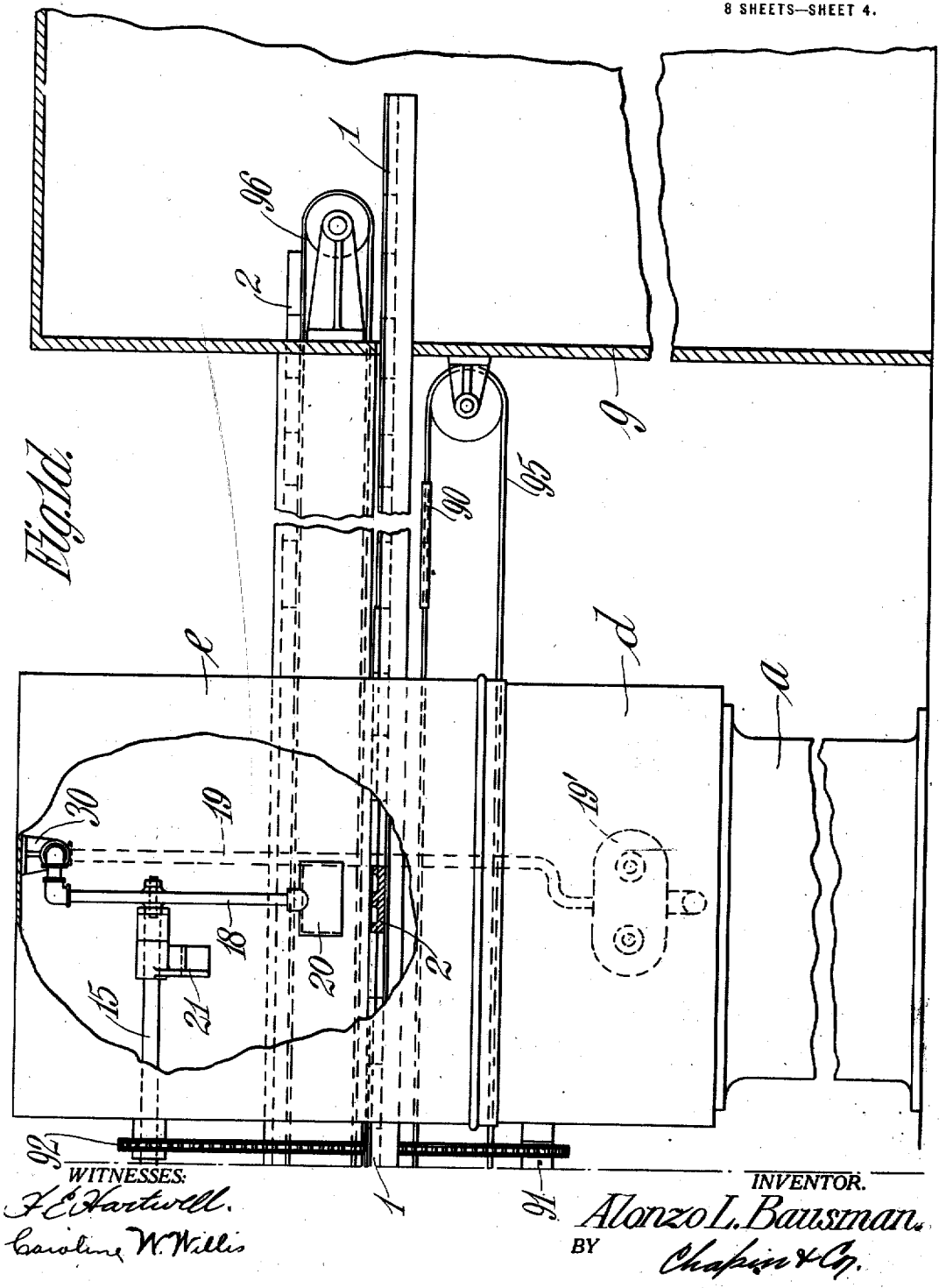

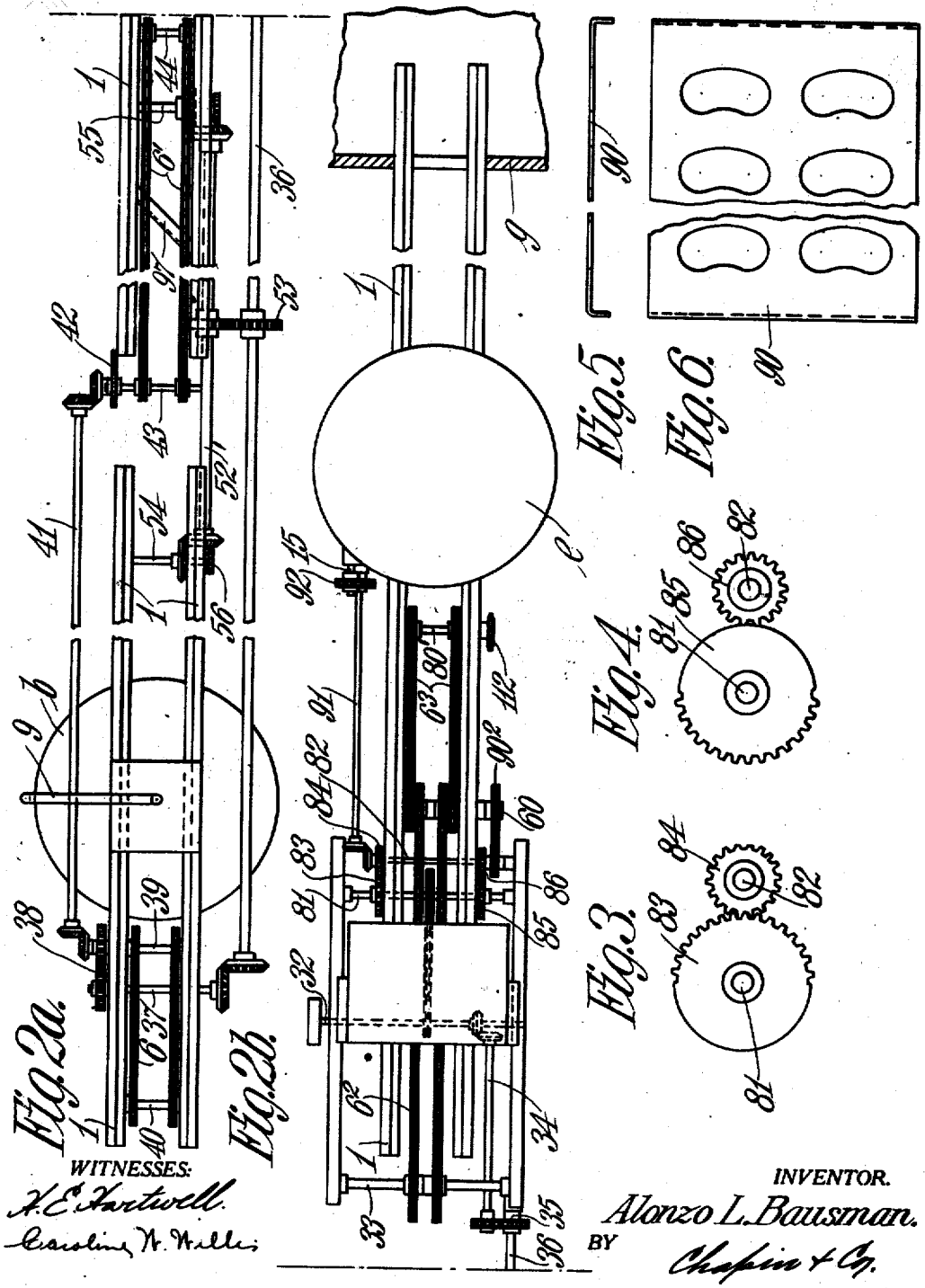

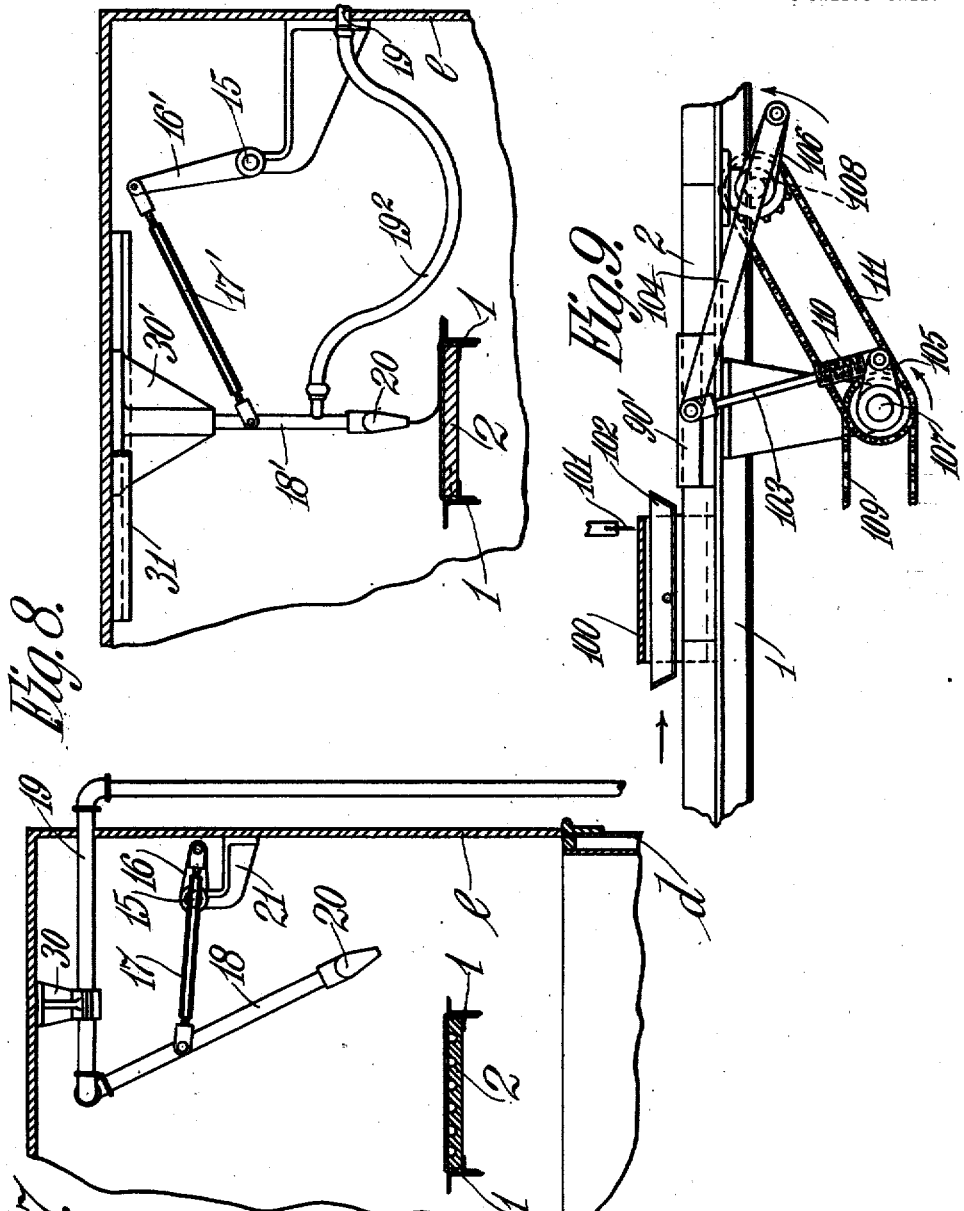

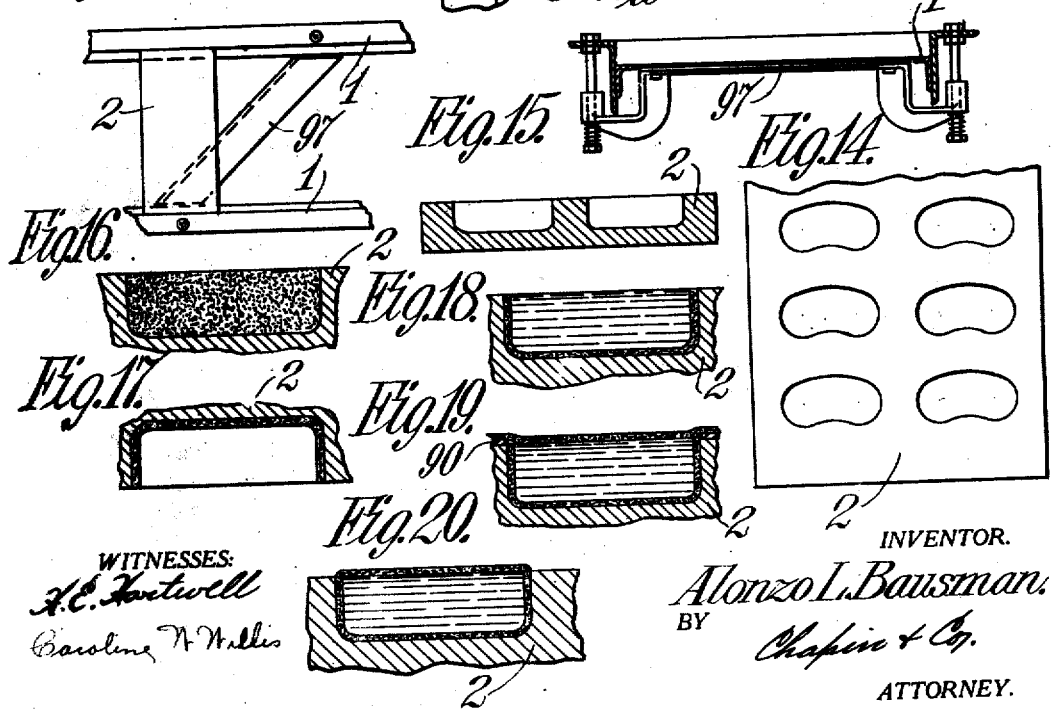

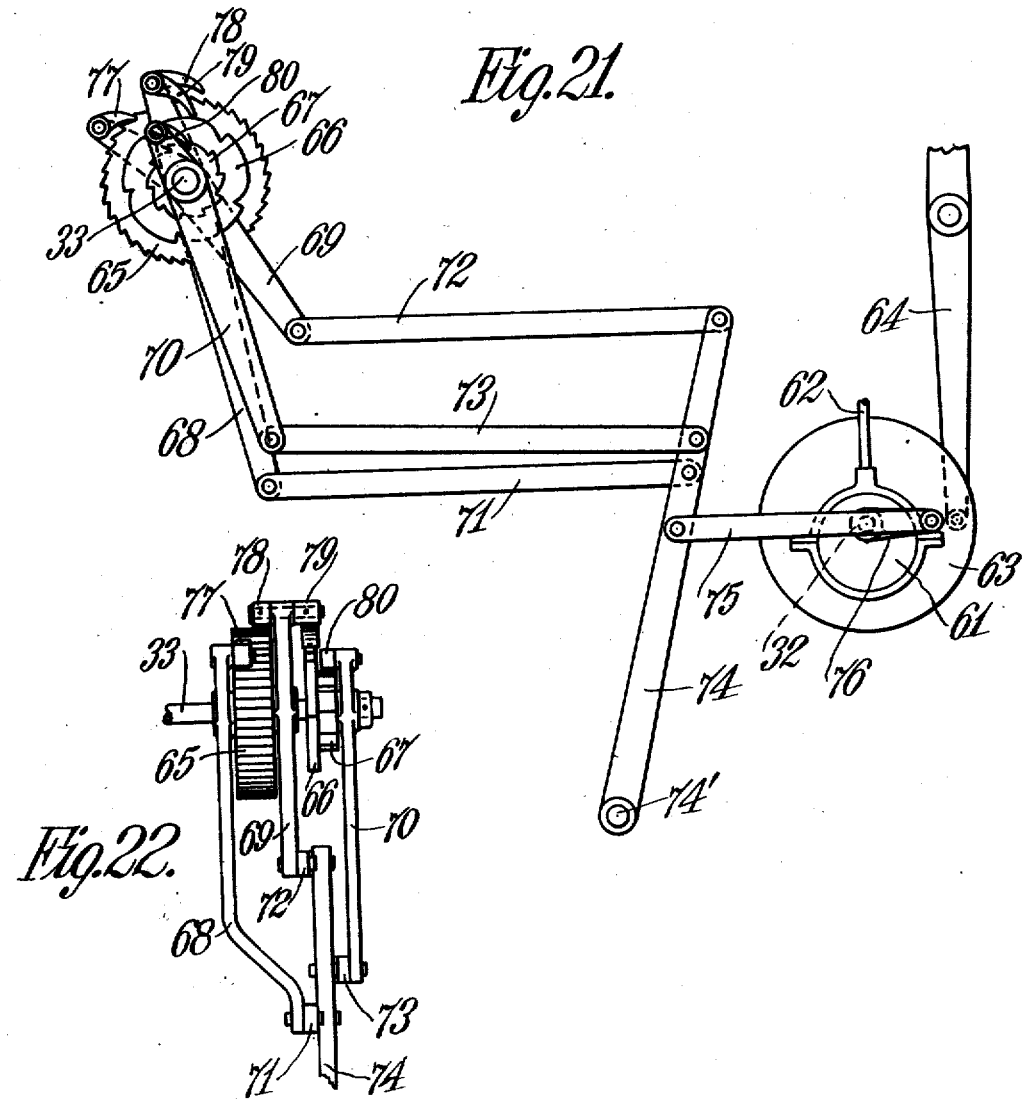

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

APPARATUS FOR MAKING CONFECTIONS.

1,276,006.  Specification of Letters Patent.  Patented Aug. 20, 1918.

Application filed April 17, 1915. Serial No. 21,994.

*To all whom it may concern:*

Be it known that I, ALONZO LINTON BAUSMAN, a citizen of the United States of America, residing in the city of Springfield, county of Hampden, and State of Massachusetts, have invented certain new and useful Improvements in Apparatus for Making Confections, of which the following is a specification.

This invention relates, broadly, to an apparatus for making confections, such as coated and chocolate covered candies, and more specifically those having a liquid center with a chocolate or other suitable containing shell. Certain features of the invention are capable of use in coating machines generally.

An object of the invention is to provide an improved confectionery apparatus, wherein the open end of a shell of coating material containing a suitable confection may be covered by laying over the open end an unbroken sheet of the coating material in such a manner that the section of the sheet required for a covering is applied practically as a whole at one instant. This is important for the reason that liquid centers especially will not ordinarily support the covering unless the pressure or weight of the covering section is uniformly and evenly distributed practically at all times.

Another object of the invention is to provide an apparatus for making confections having in combination, molds, guiding means for the molds whereby they may be fed through the apparatus, means to fill the molds with coating material, means to empty the molds of the coating material except a container of coating material in each mold, means to fill the containers with confection and means to cover the open end of the containers to completely envelop the confection.

Another object is to provide novel and useful appliances to be used with and in the apparatus just outlined.

Another object is to provide in combination in a molding machine, molding devices to mold hollow containers, a depositor to fill the containers, and a covering device to close the containers, driving mechanism to convey the molds through the machine and operate the different elements thereof in proper timed relation.

Other objects of the invention will appear in the following detailed description and annexed claims.

One preferred form of the invention is disclosed in connection with the accompanying drawings to the end that one skilled in the art may put the invention to use.

In the drawings:

Figure 1ᵃ is a side elevation of one portion of the machine in which the molds are fed to the machine and the coating material is supplied to the molds, the apparatus for the latter operation being shown partly in section;

Fig. 1ᵇ is a similar view showing a continued portion of the machine in which the mechanism for turning the molds upside down to empty therefrom all but the coating shell and for turning them right side up to receive the confection filling from the depositor;

Fig. 1ᶜ is a similar view of a continued portion of the machine showing the depositor and its relation to the driving mechanism and the path of the molds;

Fig. 1ᵈ is a similar view showing the end portion of the machine and the casing partly in section containing the mechanism for covering or closing the molded containers after the confection has been put therein as well as the casing or cooling room into which the molds containing the finished product are received, and the conveyer to return the molds and the stencils used therewith;

Figs. 2ᵃ and 2ᵇ are diagrammatic plan views of the two halves of the machine, it being necessary to show one half below the other on account of space limitations;

Figs. 3 and 4 are detail views of special gears used in the machine, and the driving connections indicating the manner of obtaining intermittent movements of one shaft with respect to the other. The views are shown together to indicate that one shaft is driven intermittently while the other is stationary and vice versa;

Figs. 5 and 6 are end and plan views respectively of one of the stencils used in connection with the molds;

Fig. 7 is a detail sectional view of one form of the mechanism used for covering or closing the filled containers and the relation of this mechanism to the molds movable through the machine;

Fig. 8 is a similar view of another form of the same mechanism;

Fig. 9 is a detail view disclosing a stencil operating mechanism whereby one stencil may be used with successive molds during the covering operation;

Fig. 10 is a detail side view of the turn over mechanism for the molds;

Fig. 11 is an end view of the same, showing the operating rods in section;

Fig. 12 is a detail view of the scraper for removing the excess coating material over the face of the stencils or molds when the latter have been turned upside down;

Fig. 13 is a cross sectional view through the guides for the molds, showing the scraper in end elevation;

Fig. 14 is a plan view of a portion of the mold showing the recesses therein;

Figs. 15, 16, 17, 18, 19 and 20 are cross sectional views of the mold illustrating diagrammatically the various steps preferred in the process of molding the confections respectively as follows: First, the empty mold, second, the mold filled with coating material, third, the mold turned upside down and emptied except for a shell lining the mold which has been retained because of the hardening of the material contiguous to the preferably cooled mold surface; fourth, the mold with its container turned right side up and filled with confection; fifth, the application of the stencil and of the covering sheet; and, sixth, the removal of the stencil leaving the molded confection complete ready to leave the mold.

Fig. 21 is a detail view indicating the means for driving from the main power shaft the depositor mechanism and the power shaft for the depositor mold conveying chains. This means has not been shown in Fig. 1ᶜ because it would cause confusion to show so many parts in one figure;

Fig. 22 is a detail front view of the levers and ratchet mechanism shown in Fig. 21 for driving the depositor mold conveying chains.

The apparatus in the form shown will first be described in its general arrangement together with the method of molding confections which it is designed to carry out, the advantages thereof will be outlined and then the details will be more specifically described as their advantages and function can be better understood.

Referring to Figs. 1ᵃ, 1ᵇ, 1ᶜ, 1ᵈ: these views are shown separately in order to keep to a reasonable scale and these views should be imagined as joined one to the other to show a continuous side elevation of the assembled machine. The machine will be frequently referred to in the following description as if these four figures were joined one to the other on one sheet.

Extending centrally and longitudinally from one end of the machine to the other, are the parallel angle pieces 1 forming the trackway or guides. This trackway is seen in cross section in Fig. 7 and is supported on suitable legs or frame pieces $a$ disposed at intervals along the length of the machine to act as supports therefor. The trackway 1 is constructed to receive, support, and guide the molds 2 from one end of the machine to the other. The trackway is open at two points at each of which a turnover device 3 to be described, is placed to receive the molds one after the other and turn them over before they are transferred to the next following trackway section.

Referring to Fig. 1ᵃ: in the first section of the machine a tank $b$ is arranged on base $a$ as a main container for coating material. Brackets $c$ supported on the tank in turn support the trackway 1, suitable driving mechanism to be described, as well as other mechanism. Immediately above the tank $b$, arranged transversely of the trackway is an open bottomed molding hopper 4 of a form well-known in paste molding machines. The molds 2, passing along the trackway 1 are adapted to close the bottom of the hopper as they pass along the trackway 1. The front edge of the hopper is distanced from the trackway enough to permit the molds, one abutting the other to pass under the hopper.

The molds are preferably made as shown in Fig. 14 in the form of boards having a plurality of recesses therein, as shown. The rear edge of hopper 4 has a hinged and spring pressed plate 7 (shown dotted in Fig. 1ᵃ) to bear against the face of the mold boards as they pass under the hopper. Each recess of all the boards, therefore, passing under hopper 4 is filled with coating material, but the tops of the boards are scraped clean by plate 7. The hopper 4 is kept filled with coating material by a pump and pipe connection 8 and 9 emptying in the hopper from the main tank $b$.

Referring to Fig. 1ᵇ, the mold boards are fed successively by the drive chains 6 from the first section of the trackway 1 into the first turn-over device 3. This device is adapted to receive a single board and is pivotally and slidably mounted to turn the board upside down, at the same time transferring it to the second section of the trackway. Here it is held by the spaced spring latches 10, one on each side of the trackway engaging the rear edge of the board near the corners. The turn-over device then retires to transfer another board, and the lugs 5 of the second section of the driving chain 6' move the boards along the trackway 1 while the coating material drains into the tank $b'$, being delivered thereto by the drip pan $b^2$, indicated particularly in Fig. 1ᵇ, from the mold recesses leaving only a shell around the surface thereof which is partially hardened. During the movement of the molds by chains 6' their top surface is scraped clean by a transversely and angularly arranged scraper 97 connected at its ends to trackway 1 over drip pan $b^2$. The boards are then successively received by the second turn-over device 3' similar to the first and transferred while being turned right side up to the third trackway section 1, being held thereon by latches 10, similar to the other latches 10, until the lugs 5 of drive chains $6^2$ move them successively along the trackway and under the depositor 13 below which each containing shell of coating material in the several recesses receives a measured amount of confection or liquid filling. The depositing device is well-known in the confectionery art and a detail description thereof is deemed unnecessary in view of patent to Carlson No. 661,008, Oct. 30, 1900. It has been chosen for use in the preferred form of the invention for it illustrates a filling device in general use which is well adapted to applicant's purpose. It is clear, however, that other devices might well be used in some broad applications of the invention to fill the containing shells in the molds. The use of the depositor in the combination is most advantageous but necessitates a special arrangement of properly timed driving mechanism for the apparatus as a whole. This mechanism will later on be described in detail.

Referring to Fig. 1ᵈ: after the molded shells or containers are filled with the desired material, they are moved farther along the trackway into the heat retaining casing $e$. This casing, preferably heated by any suitable means, has front and rear transverse openings just about large enough to accommodate the trackway and the molds. The former, extending through the casing, support the mold boards in their passage therethrough. Within the casing is a device to cover or close the filled containers in the molds with coating material.

Referring to Figs. 1ᵈ, 7 and 8, a shaft 15 is driven in a manner to be described and extends from without the casing to a bearing in bracket 21. Keyed to shaft 15 is a crank arm 16 pivoted to a link 17 which in turn is pivoted to pipe section 18. The latter is pivotally connected for swinging movement with a pipe section 19 leading from the top of the casing $e$ and supported thereby in bracket 30 to and in communication with the jacketed tank $d$ for coating material. In this connection, there is a pump 19' (see Fig. 1ᵈ) shown diagrammatically and constructed to positively force the coating material, such as chocolate, through the pipe sections 18 and 19 with a definite predetermined speed to the nozzle 20. The latter (see Fig. 1ᵈ) extends lengthwise of the machine about the distance equal to the length of one mold board. It is provided with a longitudinal slot as an opening (preferably adjustable in width) so that the chocolate emitted therefrom is forced in a thin unbroken sheet or ribbon traveling outwardly at a predetermined and definite speed. The pipe section 18, as shown, is mounted to carry the nozzle 20 and swing transversely of the trackway.

Referring to Fig. 7, if it is assumed that a mold board 2 is in line with the opening of nozzle 20, the turning of crank 16 will operate to swing the nozzle 20 across the mold board. The coating material, as chocolate, by a suitable arrangement of the pump is preferably caused to leave the nozzle so that the sheet of chocolate will be laid over the mold board without any relative horizontal movement with respect thereto. Stated generally, the speed of formation of the sheet is equal to the transverse speed of the nozzle. By this construction and arrangement, a covering sheet of chocolate is laid over the open-ended containers previously filled and held by the recesses in the mold in a uniform manner. The resulting operation may be likened to a sheet of chocolate of uniform thickness having the area of a mold board being laid flat over the upper surface of the board as a cover. In the operation, the cover sheet is applied practically in an instant so that the pressure due to its weight is evenly distributed, and there is no tendency for the chocolate to pile up in gobs or disarrange the filling in the containers as would be the case if the chocolate were applied in a drenching shower (as in the enrober coating machine). Where a liquid center or filling is desired, it is most necessary to apply the cover so that its pressure will be uniformly supported over the area of the end to be closed. The construction and arrangement described has a distinct advantage in the mechanical control of the operation of covering the containers.

It can be seen from Fig. 7 that the sheet of chocolate fed from the nozzle falls directly back into the tank $d$ when not being applied to cover the mold board. The mold boards (see Fig. 1ᵇ) after the covering operation are fed further along the trackway into a cold room or chamber $g$ where the finished molded goods are removed for cooling and packing.

In Fig. 8, the pipe 18' is shown as carried by a sliding bracket 30' mounted in ways 31 fastened to the top of casing $e$. The crank arm 16' is here keyed to shaft 15 and connected to pipe 18' by the link 17' while connection is made between pipe 19 and 18' by flexible tubing 19². With this arrangement, the nozzle 20 is carried horizontally across the mold boards 2. In this way, the sheet of chocolate laid on the mold boards can be more positively controlled than in the form in which the nozzle is swung through an arc.

The driving connections for the machine will now be described. The machine as a whole is driven from the power shaft 32 (see Figs. 1ᶜ and 2ᵇ) which is primarily the depositor driving shaft (see Fig. 21). This shaft is chosen because it is desirable to time the operation of all the other mechanism to that of the depositor. This is apparent from the fact that the mold boards 2, the walls of which are preferably uniform, (Fig. 15) are fed under the depositor in abutting relation and intermittently. The depositor fills one transverse series of recesses, the molds are moved, and the next series is filled. When the molds are moved to bring the first series of spaces of one mold under the depositor nozzles, it will be seen that they need to move an extra distance to allow for the abutting end walls of the successive molds for these are together thicker than the single wall between two transverse series of spaces in the same mold. Thus, the molds are preferably moved through the depositor by variable increments and intermittently.

From one end of the machine to the other (see Figs. 1ᵇ, 2ᵃ, and 2ᵇ), there are six sets of driving means to move the molds along the trackway 1. The driving chains 6, associated with the molding device track section, the first turn-over and transferring device 3, the chains 6' associated with the track section over the draining device, the second turn-over device 3', the chains 6² associated with the depositor device, and the chains 6³ associated with the covering device.

The chains 6 are driven from shaft 32 as follows—(see Figs. 2ᵃ and 2ᵇ)—through gear connected shaft 34, chain 35, to shaft 36 (this connection permits one revolution of shaft 36 to two of shaft 32), through bevel gears to shaft 37, and through spur gears 38, to sprocket shaft 39. The spur gear on shaft 37 has one-half of its circumference blank so that a continuous rotation of it will rotate the other spur gear and shaft 39 intermittently. For one revolution of shaft 37, shaft 39 turns a half revolution at the same speed and rests the other half. The arrangement of the gears is similar to that shown in Fig. 3, but they are the same diameter. Thus, the chains 6 carried by sprockets on shafts 39 and 40 are driven intermittently. The chains are provided with lugs 5 (see Fig. 1ᶜ) which engage the rear edge of the mold boards near the corners thereof. The latter abut one against the other, and the series is driven by chains 6 the length of one mold board each time shaft 39 is driven. The chains 6' over the draining device are driven from shaft 39 through bevel gear connection with shaft 41 and gear set 42 to shaft 43. The chains 6' are carried by sprockets on shafts 43 and 44, and the driving connection from shaft 39 is designed to move chains 6' together with chains 6 and for the same purpose. It will be seen from Fig. 1ᵇ that chains 6' are arranged over trackway 1 rather than under to keep them out of the way of the chocolate draining from the molds.

There is a separation of the trackway 1 between the molding device $b$ and the draining device. There is a similar separation between the latter device and the depositor 13. The molds are transferred from one section of the trackway to the other by similarly constructed turn-over devices 3 and 3', respectively. The arrangement of the turn-over devices 3 and 3' with respect to the trackway 1 and the driving mechanism therefor is similar and is shown in Fig. 1ᵇ. Referring to Figs. 1ᵇ, 10 and 11, the frame $a$ is provided with parallel ways in which the slides 45 are mounted. Each slide carries a bearing 46 for a stud 47. Keyed to one of these studs 47 adjacent the inner side of the bearing is a mutilated gear 48 of a form shown in Fig. 10 and on both studs a fork-shaped piece or casting 49. Each of the latter supports two vertically spaced bearing plates to receive and hold the successive molds 2 along their top and bottom side edges. The top bearing plate is spring-pressed, as shown, and the ends of both are bent to form an easy entrance for the mold boards. The castings 49 are connected together by piece 50. A rack 51 is mounted on the frame $a$ adjacent one of the ways for slide 45. Assume that a mold 2 has been moved along trackway 1 by chains 6 and into the turn-over device 3 as indicated in Fig. 10. If now the slides 45 are moved to the right (by means to be described), the teeth of gear 48 meshing with the rack 51 will turn casting 2 upside down. The parts are so designed that, when the board 2 has turned 180°, the flat part 52 of gear 48 engages and slides on the uncut extension of rack 51 which holds the mold boards from turning farther. At the latter part of this sliding movement, the mold board 2 engages and depresses two latches 10 pivoted one on each side of the frame as indicated in Fig. 1ᵇ. When the slide 45 has finished its travel to the right, the latches 10 engage the spaces of mold board 2 cut away at the corners thereof and hold it on the trackway section 1 associated with the draining device, and the turn-over device 3 is brought back to its original position. It is to be understood that the mold boards are transferred by turn-over device 3' to the trackway associated with the depositor in substantially the same way as just described.

The means for reciprocating the turn-over devices 3 and 3' lengthwise of the machine will now be described. The shaft 52' (see Fig. 1<sup>b</sup>) is mounted in the frame parallel to shaft 36 from which it is driven by gear set 53. The gear set 53 is arranged with one mutilated gear so that shaft 52 will be operated intermittently. The gear arrangement is similar to that shown in Fig. 3 and is so designed and arranged that shaft 52 will be turned during the periods of rest between the intermittent movements of chains 6 and 6' already described. Shaft 52' is connected by bevel gears to shafts 54 and 55 forming, respectively, parts of the similar driving means for devices 3 and 3'. The description of one will suffice for both. Referring to Fig. 1<sup>b</sup>, a gear 56 on shaft 54 is in mesh with a gear 57 keyed to a stud mounted on the side of the frame. Also keyed to this stud is a crank arm 58 to which a link 59 is pivoted at one end and pivoted at the other end to slide 45 (see also Fig. 11). It will be seen that, by the driving connection described, the turn over devices 3 and 3' can be carried through one complete cycle of their operation during the periods of rest of chains 6 and 6' to transfer and turn the mold boards 2 through the interrupted spaces of the trackway 1.

The peculiar driving means for moving the mold boards 2 under the depositor device 13 will now be described. The necessity of lining up the recesses of the mold boards under the depositor (such as shown in patent to Carlson 661,008, of Oct. 30, 1900) has already been mentioned. This driving means is designed to move the molds intermittently first by a short step (between centers of recesses in one mold) and second a long step (between centers of last recesses in one mold to first recesses in following mold). The means for operating the depositor has only been indicated in Fig. 21, and the means for driving the depositor chains has been in part separated from the other figures and shown in enlarged view in Figs. 21 and 22. The depositor chains 6<sup>2</sup> are similar to chains 6 and are carried on sprockets keyed to shaft 33 (Fig. 2<sup>b</sup>) and sprockets loose on shaft 60. The main power shaft 32 of the machine has keyed thereto an eccentric 61 for operating the depositor pump rod 62 and a face cam 63 for operating the pivoted "cut-off" bar 64. These parts and their association with the machine are not described in detail for they are well understood as parts of the "depositor". The shaft 33, for driving the depositor chains 6 is driven from shaft 32 as follows: a ratchet wheel 65 is keyed near one end of shaft 33, and ratchet wheels 66 and 67 are fastened together but are loosely mounted on the shaft. A lever 68 pivoted loosely on shaft 33 has a pawl 77 at the upper end to engage the teeth of and drive ratchet 65. A similarly mounted lever 69 has two pawls 78 and 79, the former a driving pawl for ratchet 65 and the latter a controlling pawl resting on the periphery of wheel 66. A third lever 70 also loosely mounted on shaft 33 has a driving pawl 80 to engage and drive ratchet 67. In order to rock levers 68, 69, and 70, they are pivotally connected at their lower ends to links 71, 72, and 73, respectively. The latter are pivoted at different points along a rocking lever 74. This lever 74 is pivoted at 74' on the main frame as indicated in Fig. 1<sup>c</sup>, and is rocked by the link 75 connected to the crank 76 keyed on shaft 32. The operation of this driving mechanism is as follows: As shaft 32 rotates constantly, the lever 74 will rock back and forth and through links 71, 72 and 73 rock levers 68, 69, and 70. On the clockwise movement of these rock levers, the pawls operate to turn shaft 33. Pawl 77 turns ratchet 65 and thus shaft 33 to move the chains 6<sup>2</sup> through the short step for the molds. The pawl 80 turns ratchet 67 and thus the ratchet 66 during this movement of the three levers. Pawl 78, however, is held out of engagement with ratchet 65 because pawl 79 (connected to pawl 78) which rests on the periphery or space between teeth of ratchet 66, holds pawl 78 out of engagement. The next movement of the rock levers operates to move the chains 6<sup>2</sup> through the long step for the previous movement of ratchet 66 has positioned one of its depressions in line with pawl 79 which falls therein to permit pawl 78 to fall in driving engagement with ratchet 65. It is apparent from the arrangement of the levers shown in Fig. 21, the pawl 78 has a longer throw than the other pawls, and it will, therefore, when acting as a driving pawl, move ratchet wheel 65 through a greater distance than pawl 77 to give the long step for the chains 6<sup>2</sup>. This cycle of operations is repeated as shaft 32 rotates the pawl 77 and pawl 78 alternating to drive the ratchet and thus shaft 33 first a short step and then a long one, and the depositor operates in a well-known manner to fill the containers held by the molds during the intervals between the driving movements of the chain 6<sup>2</sup>. Of course, it is understood that the various levers, links, pawls, and ratchets need to be accurately designed and proportioned one to the other and to the sprockets to drive the chains in the variable steps, as described. This matter of design, however, is an obvious mechanical detail in the light of the disclosure of the preferred arrangement indicated in the drawings.

The manner of driving the last set of chains 6<sup>3</sup> will now be described. These chains are carried on sprockets keyed on shaft 60 and on shaft 80; the latter being mounted in suitable bearings on trackway 1. Referring to Figs. 1<sup>c</sup>, 2<sup>b</sup>, and 4, shaft 81 is connected by chain and sprocket drive to shaft 32 for continuous rotation, the latter rotating twice for each rotation of the former. A mutilated gear 85 is keyed on shaft 81 adapted to drive intermittently a gear 86 keyed to shaft 82 in the manner indicated in Fig. 4. This kind of a drive *per se* is well-known, and no detailed description is necessary. The shaft 82 is connected by chain and sprocket drive with shaft 60 so that the latter and chains 6⁸ are driven intermittently at the same time as chains 6 and 6' to move the molds through steps equal to approximately their own length. Thus, as the mold boards are fed each by two steps from the depositor chains 6² to the chains 6⁸, the latter move them step by step along the trackway 1 through the covering casing *e* and into the cooling chamber *g*. The parts are arranged so that mold boards successively remain under the path of the nozzle 20 of the covering device between their intermittent steps through the casing *e*.

The operation of the covering device by the intermittent movement of shaft 15 has already been described. The manner of moving shaft 15 so that nozzle 20 will pass transversely across the underlying mold board on track 1 between the intermittent movements of chains 6⁸ will now be described. Referring to Figs. 2ᵇ and 3, a mutilated gear 83 is keyed on shaft 81 and arranged to mesh with and drive gear 84 loose on shaft 82 but connected by bevel gearing to drive shaft 91 which has a chain driving connection 92 with shaft 15. By comparing Figs. 3 and 4 it is seen that the respective mutilated gears 83 and 85 are arranged to drive their associated gears 84 and 86 oppositely, that is, one is driving while the other is not. Because of this arrangement the shaft 15 is stationary while the chains 6⁸ move the mold boards forward. The conveyer chains 6⁸ are stationary while the shaft 15 turns half a revolution to carry nozzle 20 transversely across the trackway during which traverse the covering sheet is laid on one mold board. The mold conveyer and nozzle thus operate in alternating steps each to perform its function in proper timed relation.

A conveyer 96 is arranged lengthwise of the machine and driven by any suitable mechanism (not shown) to carry the mold boards 2 from the rear end of the machine (see Fig. 1ᵈ) after they have been emptied in casing *g* to the front end to be used over again (see Fig. 1ᵃ). A second conveyer 95 is arranged in the same manner below conveyer 96 (see Fig. 1ᵈ) to return the individual stencils 90 taken off of the mold boards to a suitable point (see Fig. 1ᶜ) in the length of the machine where they may be again placed on the mold boards before the latter pass through casing *e* where the covering sheet is applied. The stencils 90 (see Figs. 5 and 6) are desirable in order that a part of the covering sheet (see Fig. 19) may be applied directly to close the containers which have been formed and filled as described and the other part readily removed by removing the stencils thus leaving the completed confections in the mold board.

Fig. 9 illustrates an automatic means for placing a single stencil upon successive mold boards 2 just prior to the operation of the swinging nozzle 20. With the arrangement shown in Fig. 9, a single stencil 90' only is used, which is connected by links 103 and 104 to cranks 105 and 106 respectively. The cranks 105 and 106 are fixed to shafts 107 and 108 respectively which are suitably mounted within the casing *e* below the runways 1 and are interconnected by sprockets and a chain 111. The shaft 107 may be connected by a sprocket chain 109 to a sprocket 112 (see Fig. 2ᵇ) which is fixed to the shaft 80'. Thus, as the conveyer chains 6⁸ operate the chain 109 and shafts 107 and 108 move therewith. It will be remembered that the chains 6⁸ operate intermittently while the nozzle 20 is at rest. Fixed to the side walls of the runways 1 is a U-shaped plate 100, the upper portion of which extends above and entirely across the runways 1. Fixed in any suitable manner in the casing *e* as by bracket, and in the relative position to the plate 100 shown is a flexible scraper 101. Below the plate 100 and suitably supported thereby is a drip pan 102 having an outlet above tank *d*. It is to be noted that the link 104 and crank 106 are on dead center and that the relation between the crank 105 and link 103 is such that the initial movement of the crank will move the link at its greatest velocity. Consequently, when the chain 109 is operated, the link 103 rapidly moves the stencil 90' rapidly and upwardly to the level of the plate 100 and meanwhile the crank 106 has started to force the stencil horizontally backward between the scraper 101 and the table 100. The stencil 90' is moved its entire length past the scraper 101, which scrapes the chocolate off into the drip pan 102, and is then brought forwardly by the crank 106 and lowered upon the next succeeding mold 2. The elongating spring connection 110 (of well-known construction) of the link 103 permits the crank 105 to pull the latter downwardly against the plate 100 without danger of rupture of any of the parts. The operation of scraping or cleaning the stencil takes place while the mold boards move on the trackway and the stencil is brought to rest on the succeeding mold board just prior to the sweep of nozzle 20 thereacross in casing *e*. Thus the proper location and operation of a single stencil will obviate the necessity of a large number of stencils as well as the labor of applying and removing them. It is desirable to remove the stencil while the covering sheet is warm enough to readily merge with the edges of the containers thus giving a finished appearance.

A résumé of the various operations in general follows. The molds are fed into the machine on trackway 1 where the first set of conveying chains start to drive them through the machine with their edges abutting. The molding device fills the recesses automatically, the first turn-over device transfers and turns successive molds over the draining pan, the second chain conveyer moves them successively into the second turn-over device which turns and transfers them to the depositor feed. The molds at this point have shell containers made of chocolate or other suitable material which the depositor fills with a measured quantity of confection, either paste or liquid. The depositor conveyer chains carry the molds to the following conveyer chains which feed them through the covering casing e where the containers have the cover applied whereupon the finished molded goods are fed to the end of the machine and preferably to a cooling chamber or room g.

From the detailed description it will be seen that the various parts of the machine are arranged to operate in proper timed relation one to the other and the machine as a whole illustrates a preferred form of the invention to carry out the molding of confections in an improved and automatic manner.

It is recognized that various modifications of the specific form of the machine shown may be made to carry out the desired operations and the invention is, therefore, defined more properly by the annexed claims than by specific reference to the form of the machine for illustrative purposes.

What I claim is:

1. A molding machine comprising, a series of open ended molds, means to feed said molds into the machine, means to fill the molds with coating material, a turn over device to turn the molds upside down whereby the coating material is drained therefrom except molded containers, a second turn over device to turn the molds right side up, means to successively deposit suitable fillings in said containers, and mechanism successively operable on each mold during an interval of rest to lay a covering sheet of coating material over said filling, whereby said containers are closed.

2. A confectionery machine, comprising, conveying means for the confectionery, a nozzle arranged to move parallel with the conveyer, continuously operable measuring means to positively force a measured unbroken sheet of coating material from said nozzle, and means to move said nozzle across the conveyer at substantially the same speed as the formation of the sheet emitted from said nozzle.

3. A confectionery machine, comprising, a conveyer, a sheet forming nozzle, continuously operable measuring means to positively force confectionery from said nozzle in a measured substantially unbroken sheet, and mechanism to move said nozzle with respect to said conveyer at a speed substantially equal to the formation of said sheet.

4. A confectionery machine, comprising, a sheet forming nozzle, a support for the confectionery, continuously operable measuring means to positively force confectionery from said nozzle in a measured substantially unbroken sheet, and mechanism to move said nozzle with respect to and over said support at a speed substantially equal to the formation of said sheet.

5. A molding machine, comprising, a series of molds, means to feed the molds successively through the machine, coating means for the molds, means to fill the molds after they have been coated, a stencil, automatic means for applying the stencil to each mold successively, and means to lay a cover of coating material upon the stencil to cover that filled mold to which the stencil is applied.

6. In a molding machine, a series of mold boards having recesses, means for forming an open shell of coating material in said recesses, means to fill said shells and means to cover the open ends of the shells with a layer of coating material, said last-named means comprising a sheet forming nozzle, conveying means to move the boards successively beneath the nozzle, means to move the latter across the conveying means, a stencil plate and automatic means for applying the stencil plate to each mold successively, whereby a sheet of coating material may be laid on said plate leaving separate coverings for the filled shells when the plate is removed.

7. In a molding machine, a series of mold boards formed with recesses, means for forming open shells of coating material in the recesses, means to fill said shells and means to cover the open ends of the latter with a layer of coating material, said last-named means comprising a sheet forming nozzle, means to move the boards step by step beneath the nozzle, a stencil plate adapted to cover a mold board and having openings to register with said recesses, means to move the nozzle across said plate to lay an unbroken sheet of coating material thereon, means to lift the stencil plate from the coated shells and lay it upon a succeeding mold board during the step by step movement of the boards, and means operable during the interval of movement of the boards to remove the coating material from said stencil.

8. A confectionery machine, comprising a conveyer, molds thereon, a sheet forming nozzle, means to move the molds step by step beneath the latter, means to force confectionery from the nozzle in a measured substantially unbroken sheet, and continuously operable devices to move the nozzle back and forth across the conveyer at a speed substantially equal to the formation of the sheet, said step by step means arranged to operate at the end of each stroke of the nozzle, whereby one complete cycle of the latter effects a coating of two mold boards.

9. A confectionery coating machine, comprising, a container for coating material, a confectionery conveying means movable step by step above said container, a sheet forming nozzle connected to the latter, means to positively force material from the nozzle in a measured unbroken sheet, and means to move the nozzle back and forth across the conveyer, said conveying means arranged to operate at the end of each stroke of the nozzle, and the latter being arranged to overlie said container at the end of each stroke.

10. In a confectionery machine, a series of molds, means to fill the latter with coating material, a conveyer to move the molds past said means, a second conveyer in line with but spaced from the first conveyer, a turn over device arranged to receive a mold from the first conveyer and transport it to the second conveyer, means to reciprocate the device constructed to gradually start and gradually stop the device from the first to the second conveyer, and means operable during the reciprocating movement to turn the mold upside down, whereby the material may be drained from the mold except for hollow molded containers.

11. In a confectionery machine, a pair of alined conveyers, the delivery end of one being spaced from the receiving end of the other, mold boards carried by the first conveyer, a frame into which a board is adapted to be forced by the first conveyer, slidable members arranged to rotatably support the frame, means to reciprocate said members to move a board into the path of the second conveyer constructed so that the board is gradually started and gradually stopped and devices to turn the frame during the reciprocatory movement, whereby the mold may be delivered upside down to the second conveyer.

12. A molding machine, comprising, a molding part through which the molds move in abutting relation, a draining part through which the molds move upside down in spaced relation, a filling part through which the molds move right side up in spaced relation, a covering part through which the molds move in abutting relation, a device to turn the molds upside down and transfer them from the molding to the draining part, a like device to turn the molds right side up and transfer them to the filling part, a separate mold feeding means for each of said parts, a separate means to operate each of said devices, a common power shaft for each of said mold feeding and operating means, and connections between said shaft and each feeding and operating means to time the feeding of the molds and their transfer from one part of the machine to the other to the operation of each part.

ALONZO LINTON BAUSMAN.

It is hereby certified that in Letters Patent No. 1,276,006, granted August 20, 1918, upon the application of Alonzo Linton Bausman, of Springfield, Massachusetts, for an improvement in "Apparatus for Making Confections," errors appear in the printed specification requiring correction as follows: Page 3, line 78, for the word "nozzlle" read *nozzle;* same page, line 116, for "Fig. 1$^b$" read *Fig. 1$^d$;* and that the said Letters Patent should be read with these corrections therein that the same may conform to the record of the case in the Patent Office.

Signed and sealed this 15th day of October, A. D., 1918.

[SEAL.]

R. F. WHITEHEAD,
*Acting Commissioner of Patents.*